Figure 1:
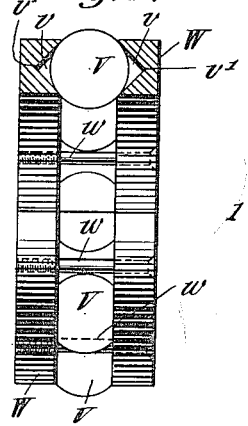

H. HESS.
GAGE.
APPLICATION FILED DEC. 9, 1910.

1,169,327. Patented Jan. 25, 1916.

Witnesses:
Frank S. Ober
Donald Campbell

Inventor:
HENRY HESS
By his Attorneys ROGERS, KENNEDY & CAMPBELL,
BY

UNITED STATES PATENT OFFICE.

HENRY HESS, OF PHILADELPHIA, PENNSYLVANIA.

GAGE.

1,169,327. Specification of Letters Patent. Patented Jan. 25, 1916.

Application filed December 9, 1910. Serial No. 596,432.

*To all whom it may concern:*

Be it known that I, HENRY HESS, a citizen of the United States, residing at Philadelphia, in the county of Philadelphia and State of Pennsylvania, have invented certain new and useful Improvements in Gages, of which the following is a specification, reference being had therein to the accompanying drawing.

My invention relates to gages or instruments for determining or measuring the size or dimension of objects.

More particularly my invention relates to that class of gages heretofore referred to as fixed-dimension gages, wherein in the practical use of the gage there is no adjustment of the gaging surfaces, the same being permanently set for a fixed size or dimension to which the object being gaged must accord in the use of the instrument.

Gages of the present invention are to have provided preformed spherical hardened steel balls, the gaging contacts consisting solely in portions of such balls; and such gages being preferably made or provided in complete sets of sizes, for example one gage for each difference of a sixteenth of an inch within a given range.

This application and invention is subsidiary to my generic inventions for which applications are now pending, this present application being directed to that specific embodiment of the broad inventions which contemplates a gage consisting of a handle or support in immovable connection with a (that is, one or more) circularly-arranged series of preformed spherical hardened steel balls, the said balls located to afford all of the gaging contacts, and the said gage being of a scientifically determined diameter, the same being either for measuring interiors such as the diameters of bores, or exteriors such as the diameters of shafts.

As instances of the present invention the drawings hereof show both interior and exterior gages; and for each of them the present invention may be applied with variations such as, for example, the variation from a single to a double gage or measure with a scientifically determined difference between the two so as to constitute of the instrument a so-called tolerance gage with respect to which the object being measured must exceed the smaller measure and be less than the larger measure to comply with the gage. Any of the gages or variations hereof may be so constructed as to be detachable, although obviously the parts may be permanently soldered or otherwise connected.

A gage or system of gages constructed in accordance with my invention affords a great many advantages with respect both to the manufacture thereof and the use or practice thereof. For example, it will be appreciated that the employment of a spherical shape for all the gaging parts gives the very greatest accuracy of contact in measuring an object as to its internal or external diameter. The actual part of the instrument which is in contact with the object always consists of points of contact and theoretically these would be mathematical points, which obviates many possible errors.

With respect to the employment of preformed spherical hardened steel balls there is a great deal to say. Thus a ball possesses the advantage of maintaining its correctness of shape in a higher degree than other shapes. This is because all articles made of hardened steel are subject to change due to a change in the conditions of internal stress. A hardened steel object is internally strained in all directions due to violent stresses produced in quenching the steel from a high temperature. In time these stresses relieve themselves with the result that the article somewhat changes its shape. The change will be the greater if the differences be greater in the internal strains in different sections of the object. Therefore the less uniform in shape an object is, the greater will be the change in shape due to the gradual release of these internal strains. Further the greater the departure of an object from uniformity of section, the greater will be the strains originally set up in quenching at the high temperature.

The sphere is the one shape which is uniform in every direction, and in which therefore the least internal strains will be set up by quenching, and in which further there will be the least change in shape by the gradual release of the internal strains. The hardness of these steel spheres is known to be superlative and the sphere may be made very much harder than any other shapes such as cylinders, rings, bars, etc. The sphere is also subject to very much less damage by direct nicking or indenting of its surface and by change of shape due to violent or improper treatment, as for example when the gage is carelessly allowed to fall upon a hard object. Besides these advantages the hardened steel spheres afford cheapness in the construction of the gage, which is a very considerable factor. The cheapness and accuracy of hardened steel spheres permit under my invention an entire system of gages to be constructed, the same of less cost to the user than that of a single gage of the heretofore well known adjustable type, such for example as the micrometer gage, which is in reality a machine, and one of great accuracy of workmanship, it being designed with moving parts enabling it to be set to correspond with the size of an object, whereupon such size is indicated upon the scale which also constitutes a part of the micrometer gage. With my invention employing the hardened steel balls, the latter are merely made by well known scientific methods in proper sizes, and an appropriate series of them selected to be made up into systems of gages; and by the word "system" I intend not only the graded set of balls and the means that supports them, but also the means for distinguishing them one from the other, such for example as the directions or indicating marks, which would preferably be figures showing the actual sizes, the same etched or otherwise applied upon the balls or their supports.

A system of gages made according to my invention is adapted not merely to be used as a standard of reference for other gages, but owing to the qualities hereinbefore and hereinafter referred to, the same are adapted to direct use by a workman in a shop.

I have already referred to that class of gages which may be termed "fixed-dimension gages" and have stated that the present invention has particular reference thereto. Indeed it is one of the great advantages of the present invention, as the same has been previously set forth, that it enables each gage to be a fixed-dimension gage, not only by the immovable connections of the spheres to their supports, but by the fixed, exact and unchangeable relation between the measuring points, parts or contacts of a given gage. Resulting from this in turn are many advantages of real practical value. Thus all mechanism is dispensed with and the instrument is purely and simply a gage and has none of the complications of a machine, to which objection the micrometer gage is open; there are no screws to be operated, and there is no adjustment or movement of parts in the employment of the gage. Indeed this will be seen to greatly enhance the convenience of the article, as the workman or his superior has merely to make a selection of the proper gage, and then he has in hand a solid thing of predetermined characteristics and with no possibility of error either in the adjustment thereof to the object to be measured or in the reading of the scale which pertains to it. Greater durability results not only because the wear involved is distributed over a great many individual gages, but also because of the entire absence of any wear due to movement or adjustment of screws or other parts. The simplicity of the immovable attachment of the steel spheres to their supports promotes the cheapness and therefore the availability of the invention, this being due to the absence of expensive working parts, the only problem and expense being incurred in fixing the steel spheres, when a plurality are employed, at the required distance from each other, for accomplishing which I have devised expedients. It will be understood that by immovability I mean lack of operation or adjustment when in practical use, and I do not mean that the spheres are to be undetachable; in some cases I would prefer to have them detachable.

The gage of the present invention possesses in addition the superlative advantage that the steel balls will find inaccuracies in the surfaces to be explored which the ordinary gages are unable to detect; because the balls can follow the changes in the shape of the surfaces since they measure successive dimensions, whereas an ordinary gage is able only to measure minimum or maximum dimensions owing to its substantial length and surface of contact. It is understood that a gage is supposed to be of the same dimension as that of the object which is to be measured and with this in mind it is quite conceivable that an ordinary exterior gage which is, for example, .001 inch larger than the thickness of the shaft, could not be passed over the shaft if it were at all irregular. My gage on the contrary would pass over the shaft even though the gage were only .0001 larger than the dimension of the shaft.

I will now describe several instances of the class of gage herein referred to embodying the characteristics of the present invention, and will then point out the novel features in the claims.

Figure 2:
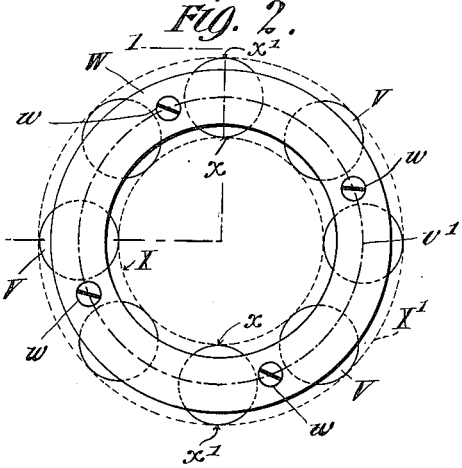
Figure 3:
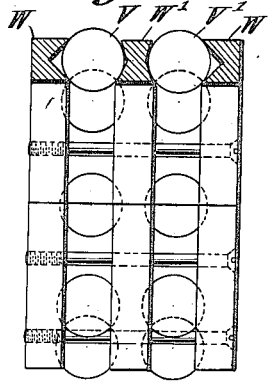
Figure 4:
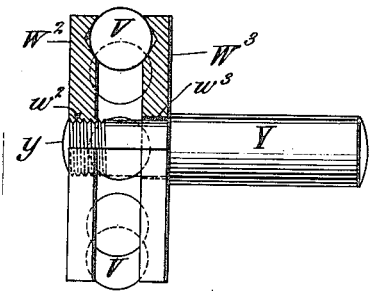
Figure 5:
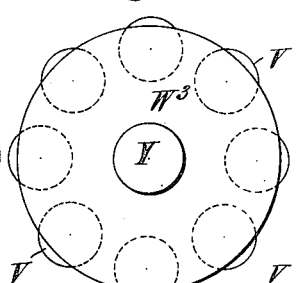
Figure 6:
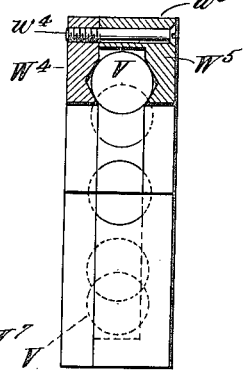
Figure 7:
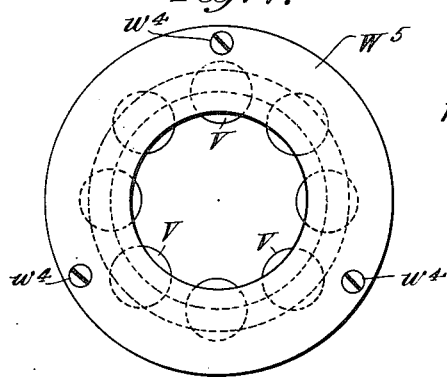
Figure 8:
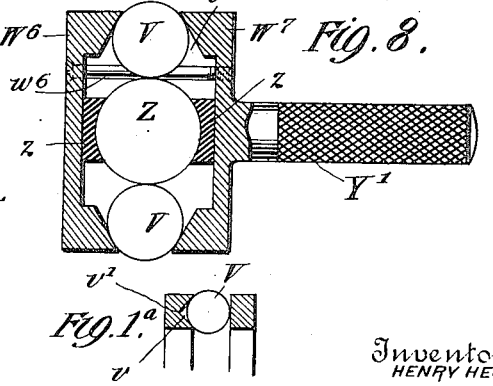

In the drawings accompanying this application and forming a part of the same, Figure 1 is a side view of a simple form of embodiment of my invention comprising a supporting means which serves as a handle, the same in immovable connection with a circularly-arranged series of preformed spherical hardened steel balls; the balls being so located and the support being so constructed that the balls afford all of the gaging contacts both for measuring exteriors such as shaft diameters, and interiors such as bore diameters. Fig. 1ᵃ is a detail variation. Fig. 2 is a face view of the gage shown in Fig. 1. Fig. 3 shows the invention applied to a gage differing from that of Figs. 1 and 2 in that the circular series of balls is duplicated and the support extended, so that there are substantially two gages comprised in one which may be so proportioned as to constitute of the instrument a tolerance gage. Fig. 4 shows the invention applied in a slightly different manner, in this case with an extended handle which serves also to lock or attach the parts together; this gage of Fig. 4 serving only for measuring bores or interiors. Fig. 5 is a face view looking from the right-hand side of Fig. 4. Fig. 6 represents another embodiment which in this case serves only as an exterior or shaft gage. Fig. 7 represents a face view of the same from the right. Fig. 8 shows a modified form of the interior gage embodiment, and Fig. 9 a similar form with means to standardize it.

Similar letters of reference will be employed to designate corresponding parts in the several figures of the drawings.

V represents a series of, that is three or more, preformed spherical hardened steel balls, these being arranged in a ring or circle in each of the different embodiments shown in the drawings, and the balls located to afford all of the gaging contact; in some instances the gaging being done by contact with the inner points of the several balls, as for example when gaging a shaft, in other cases the outer points when gaging a bore, and in Figs. 1 and 3 both the inner and outer points are employed so that either a shaft or a bore may be gaged.

Referring now to Figs. 1 and 2, the circular series of balls V, V, V, etc., are shown in immovable connection with a support which may be considered as a handle for handling the instrument, the support in this instance consisting of a pair of similar but opposed supporting pieces W, W, held together as will be described, and holding between them in an immovable manner the spheres V, V, V. Each of the two pieces W, W is shown as of an annular form so proportioned with respect to the size of the spheres that the latter will extend beyond the supporting piece both interiorly and exteriorly, as is clear in Fig. 2. In order to maintain the balls in position the supports are peculiarly formed, for example, a recess or inclosure v is provided in either one or preferably both of the supporting pieces W. This inclosure may take any form but I prefer it to show in cross-section as of V-form or having an angle with or without an apex at v', and the inclosure will preferably be annular extending entirely around each of the pieces W as indicated in Fig. 2 by the dotted position v' of the apex of the inclosure. Means to hold together the two supporting pieces W may consist for example of screws w so located as not to conflict with the balls V.

The instrument just described is complete in itself, is convenient in handling, is rigid having no moving parts, is of the most desirable character as regards the form and substance of the gaging contacts, and finally as shown it can be disassembled by removing the screws w.

In use in gaging exterior diameters such as axles, the innermost points $x$, $x$, etc., of the respective spheres form the gaging contacts, and these taken collectively define an imaginary circle marked X which will be the same as the circumference of the shaft to be gaged. When used as an interior gage the outermost or highest points $x'$ of the respective spheres act connectively as contact points to define an imaginary circle X' which will be the same as the circumference of the bore being gaged. When gaging shafts the instrument may be regarded as a ring gage of peculiar characteristics and when employed for gaging bores it may likewise be regarded as a plug gage.

Manifestly the gage just described may be varied in its gaging dimensions not by adjustment but by detachment and replacement of the spheres by spheres of a known larger or smaller diameter. If the recesses or inclosures $v$ are symmetrical and have equally slanting sides with respect to a line connecting the apexes $v'$, thus constituting V-grooves, then the external diameter of the gage will be the diameter of the circle $v'$ plus the diameter of one sphere V. This simple rule enables a given instrument to be altered to any desired dimension by the mere substitution of spheres of accurately known diameters.

Referring now to Fig. 3, W represents the supporting piece as before, and V the spheres arranged in a circular series. In addition this modification involves a second series of spheres V', there being an intermediate supporting piece W' having V-grooves or recesses on both sides so as to accommodate the balls of both series. By now selecting the spheres V of one size and spheres V' of a slightly larger size, the instrument will serve as a tolerance gage for either interiors or exteriors. For example, a workman is to manufacture a shaft of a given diameter and is allowed a latitude of, say, .0001 inch. By properly selected spheres the instrument of Fig. 3 will so operate that when the shaft has attained the exact size it will pass between or within the series of spheres V, but will not pass within those marked V'. This idea of constituting my gage as a tolerance gage may be carried out through the remaining figures of the drawings hereinafter to be described.

Referring now to Fig. 4 and Fig. 5, this embodiment of my present invention constitutes only a plug or interior gage, it being incapable of measuring exteriors, the spheres V being exposed only at their outermost points. The supporting pieces $W^2$, $W^3$ take a new form owing to the fact that they are no longer ring shaped or annular, each of them now being merely a flat circular disk with the proper recesses or inclosures. In this modification in place of the screws $w$ to hold the supporting pieces together and thus confine the spheres, I have provided a member Y which serves well as a handle, and the outer portion of which is intended for that purpose, whereas the other portion is made to take the form of a screw-threaded bolt as seen at $y$, this extending through an aperture $w^3$ conveniently placed in the disk $W^3$ and having a screw-threaded engagement at $w^2$ with an aperture oppositely located in the disk $W^2$. The spheres being properly located between the two disks the handle Y is simply thrust through disk $W^3$ and screwed into the aperture of disk $W^2$ until the parts become rigidly bound together, a shoulder $y'$ on the handle serving as an abutment for receiving the pressure of disk $W^3$.

Referring now to Figs. 6 and 7 the embodiment shown therein is merely for exteriors and not for interiors, it having a central aperture for receiving the shaft or other object whose exterior diameter is to be measured. In this case the supporting pieces $W^4$, $W^5$ take a form which enables them to be connected to each other at a point radially outward from the position of the spheres V. Piece $W^5$ has a lateral extension $w^5$ extending toward piece $W^4$ and a screw $w^4$ is passed through piece $W^4$ as shown and engaged in a threaded hole in piece $W^5$.

Referring now to Fig. 8, the means for inclosing the spheres is shown in a modified form. In the modifications herein described, the gaging diameters were dependent upon the diameter of the V-shaped recess $v$ combined with the diameter of the sphere V; whereas in the modification of Fig. 8 the gaging diameter is not dependent upon any recess or inclosure but upon the diameter of the spheres constituting the circular series in combination with the diameter of an interposed or central member, disk or ball. V represents one of the several spheres arranged in a circle as before, and $W^6$, $W^7$ the two portions of the support between which the balls are confined or inclosed. Y' represents a handle secured to the piece $W^7$, and $w^6$ represents connecting screws for binding together the pieces $W^6$ and $W^7$. In this modification the pieces $W^6$, $W^7$ do not form or possess V-shaped grooves, but nevertheless they do constitute or form an inclosure which binds the spheres V in place. Thus the inner opposed faces of the supporting pieces are not flat and parallel but are inclined away from each other inwardly so as to form an inclosure or space $v^2$ within which each of the spheres V is held by the contact and clamping force of the supporting pieces. Obviously the tendency of this arrangement is that the spheres V shall be forced centrally or toward each other, which is not the case in the preceding figures of the drawings; but this tendency is met and utilized by interposing in the center of the instrument and within the circle of spheres, a member Z which may be a disk or may be a sphere, itself of given diameter. Against this member Z all of the spheres V are held in intimate contact by the action just described. It will be obvious from this arrangement that we have an accurate gaging instrument whose outer diameter is that of the central member Z added to twice the diameter of one of the spheres V. In order to hold the central member or ball Z securely in the position shown, an elastic or yielding medium may be employed, such for example as the cushions $z$, $z$ located respectively between the pieces $W^6$ and $W^7$ on the one hand and the member Z on the other hand. In gages of large diameter of this nature I prefer to use a simple disk or cylinder for member Z on account of the expense of a sphere for that purpose, but with a small diameter gage I prefer the sphere for a central member as involving less expense than the making of a special cylinder or disk. It is obvious that the size of the gage of Fig. 8 may be altered not only by substituting other spheres V for spheres of a larger or smaller size, but also by substituting for the member Z another member of different size.

It is obvious that the principles intended to be covered herein are broader than any of the specific embodiments illustrated, and no limitations to the specific features are intended to be made except such as are expressed in the claims hereof. Many variations may be incorporated upon the specific embodiments illustrated within the principles of my improvements; thus for example, the support although referred to in the singular may be made up of a plurality of parts in some cases directly connected together, or unconnected as may be desired; the V-grooves illustrated may be provided singly or in plural so that one series or, if desired, a plurality of series of balls may be encompassed within a single pair of support pieces, and the balls constituting a series may differ in size if properly calculated to meet the needs of the gage; thus for example, in the combined interior and exterior gage there may be either a different set of balls or a greater number of balls for the exterior than for the interior. The use of gages embodying the present improvements is not confined strictly to the gaging of exteriors or interiors that are circular as distinguished from being varied from the shape of a circle.

Figure 9:
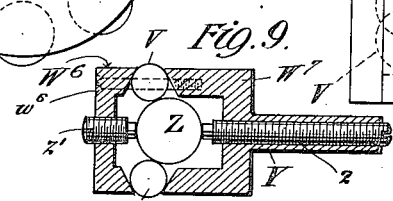

Means may be employed, not for adjustment, but for standardization if desired, that is to say initially or subsequently setting the several balls at the precise distances from the center or from each other required to retain such location throughout the employment of the gage. An example of such means of standardization is illustrated in Fig. 9, which like Fig. 8 has a circular series of balls V and a central member Z which in this case will not be a disk but will be a sphere or other form serving the purposes to be described. It is evident that an axial shifting movement of the member Z will alter its relations to the spheres V and thereby alter the relation of spheres V to each other. $z$ represents a standardizing screw engaging screw threads within the part Y and capable of being operated at its outer end, the inner end of screw $z$ contacting with the member Z. Taking the parts as they are illustrated in Fig. 9 it will be seen that by loosening the clamping screws $w^6$ the pieces $W^6$ and $W^7$ may slightly separate allowing the spheres V to move radially outward. By now screwing the screw $z$ inwardly this will serve to take up the slack by pressing the member Z up against or in between the series of spheres as they are permitted to move. The arrangement may be supplemented by adding a second standardizing screw $z'$ opposing the screw $z$, the member Z being held between them. When it is desired to make smaller the diameter of the gage, screw $z$ will be loosened and screw $z'$ forced inwardly moving the member Z to the right and enabling the screw $w^6$ to be tightened. The arrangement described is not intended for adjustment or for alteration of a gage during employment and in fact it is desirable when the gage has been standardized to secure the parts in position by applying soft solder or the like to the heads of the screws $z$, $z'$ and the screw $w^6$.

Where in the claims the expression "a series of balls" is employed, it is intended to include one or more series. The expression circularly-arranged is intended to include an arrangement of three or more spheres in such a way as to determine the position of a circle that may be drawn through their contact points; as distinguished for example from the arrangement of mere opposition of one or more spheres opposed to one or more spheres for calipering the thickness of a flat sheet.

What I claim as new and desire to secure by Letters Patent, is:

1. A fixed-dimension caliper gage comprising in combination a support, and in immovable connection with and secured to said support a circularly arranged series of three or more spheres located to afford all the gaging contacts, and the support shaped to permit objects to be gaged to pass between such spheres for gaging the exterior, or outside of such spheres for gaging the interior or bore.

2. In a fixed-dimension caliper gage the combination of a rigid support for a series of more than two preformed spheres, and, in immovable connection with said support, a circularly arranged series of more than two preformed spheres held by said support in an exactly known manner whereby to coöperate in determining the correspondence of a circular surface with said gage, said spport consisting of two separate opposed, rigid, sphere-clamping parts, at least one of which is provided with an annular sphere receiving recess, and the two parts held rigidly in mutually opposed relation with the spheres clamped rigidly and immovably between them.

3. In a fixed-dimension caliper gage the combination of a rigid support for a series of more than two preformed spheres, and, in immovable connection with said support a circularly arranged series of three or more preformed spheres held by said support in an exactly known manner whereby to coöperate in determining the correspondence of a circular surface with said gage, and a second similar series of spheres similarly held by said support for determining a slightly different circular size, said support comprising three substantially parallel circular support pieces spaced axially from each other, the first and second holding the first set of spheres between them and the second and third the second set of spheres.

4. In a fixed-dimension caliper gage the combination of a rigid support for a series of more than two preformed spheres, and, in immovable connection with said support, a circularly arranged series of more than two preformed spheres held by said support in an exactly known manner whereby to coöperate in determining the correspondence of a circular surface with said gage, said support consisting of two separate, opposed, rigid, sphere-clamping parts arranged facing each other at opposite sides of the plane of the spheres, and at least one of which parts is provided with an annular sphere-receiving recess, and the two parts held rigidly in mutually opposed relation with the spheres clamped rigidly and immovably between them.

In testimony whereof I have affixed my signature in presence of two witnesses.

HENRY HESS.

Witnesses:
W. A. TOWNER, Jr.,
DONALD CAMPBELL.